United States Patent
Geres

[11] 3,854,678
[45] Dec. 17, 1974

[54] ROTARY VALVE JET FLAP CONTROL SYSTEM

[75] Inventor: Robert J. Geres, China Lake, Calif.

[73] Assignee: The United States of America as represented by the Secretary of Navy, Washington, D.C.

[22] Filed: Sept. 17, 1973

[21] Appl. No.: 398,039

[52] U.S. Cl............. 244/3.16, 244/3.22, 244/42 R, 102/3
[51] Int. Cl............................................ F42b 25/24
[58] Field of Search....... 244/3.16, 3.22, 3.25, 42 R, 244/42 CB, 42 DA, 76 J; 102/3

[56] References Cited
UNITED STATES PATENTS

| | | | |
|---|---|---|---|
| 2,968,454 | 1/1961 | Merrill et al. | 244/3.22 |
| 2,992,794 | 7/1961 | Boyd | 244/3.25 |
| 3,066,894 | 12/1962 | Davidson | 244/42 |

Primary Examiner—Verlin R. Pendegrass
Attorney, Agent, or Firm—R. S. Sciascia; Roy Miller; Robert F. Beers

[57] ABSTRACT

A jet flap control system for bombs, missiles and aircraft that is deployed along the trailing edge of a wing for achieving high lift at zero angle of attack. The jet flap can be utilized to provide wing lift, roll control and a small amount of altitude control without appreciably increasing the drag.

3 Claims, 7 Drawing Figures

PATENTED DEC 17 1974 3,854,678

ROTARY VALVE JET FLAP CONTROL SYSTEM

BACKGROUND OF THE INVENTION

1. Field of the Invention

The present invention relates to controlling bombs, missiles and aircraft and more particularly to a control system that utilizes a plurality of jets placed along the trailing edge of a lifting surface to achieve wing lift, roll control and altitude control.

2. Description of the Prior Art

One of the major drawbacks of aircraft attacking ground targets with bombs or missiles is the accuracy necessary to hit the chosen target. Conventional weapons for air to ground attack are gravity bombs and missiles. Because of the high speeds of the fighter and the brief time available over the target the launch constraints required for attack with conventional weapons are severe. Accurate delivery of such weapons requires the attacking aircraft be flown at altitudes and ranges that make it extremely vulnerable to surface air weapons. A guided air dropped device provides increased accuracy of delivery while reducing the risk to the attacking aircraft.

In the past, the accuracy of dropping bombs and missiles from aircraft has been attacked by providing guidance systems on the bombs and missiles for steering them to the target once they have been released from the aircraft. The guidance system usually activates an aerodynamic control surface or surfaces to provide steering for controlling the direction of the air dropped missile.

Control surfaces of the canard configuration have been used as one means to control and steer bombs and missiles. Because the canard control surface areas are relatively small additional control means such as reaction jets attached to rotate with the control surface have been used to provide aerodynamic control at low missile or bomb velocity. These systems of control are necessarily complex and are not suitable in an application where a relatively simple and inexpensive control system is required.

SUMMARY OF THE INVENTION

It is an object of this invention to provide a new and improved control system for use with a lifting surface such as a wing that gives higher lift to drag ratio than present aerodynamic control surfaces and can be operable to provide axial thrust or to provide control functions for guiding an airborne vehicle during flight.

A feature of the invention is a control system that utilizes a plurality of jets along the trailing surface of a winged bomb, aircraft or missile for achieving control and providing additional lift. Conventional bombs have very little means to control their flight to the designated target once the bomb has been released from the carrying aircraft. Modern high speed aircraft have incorporated complex fire control systems for advising the pilot of the aircraft at what point in time a bomb should be released to strike a chosen target. If the target is not stationary but moving the chances of hitting the chosen target decrease without some means of guidance control on the bomb or missile after its release from the aircraft. The addition of a wing located near the center gravity of the bomb provides sufficient lift capability to the bomb and a maneuvering capability sufficient for accurately attacking stationary as well as moving targets such as tanks, road vehicles, trains and high speed vehicles.

The control system for maneuvering the bomb is a jet flap arrangement rather than conventional aerodynamic flaps. The jet flap has the feature of low drag in comparison with aerodynamic flaps. This feature is very desirable for controlling the vehicle during the free fall gliding portion of its flight.

A similar jet flap control system may be utilized with high velocity cruise missiles and with short takeoff and landing aircraft to provide fast response high-G maneuvering capability during flight without the use of aerodynamic flaps which could have a deleterious effect during certain flight phases of the aircraft or missile.

Figure 1:
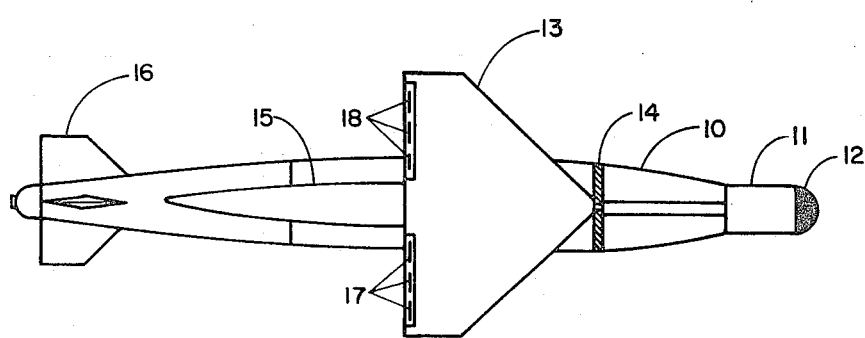
FIG. 1 is a view in elevation of a bomb with a wing attached showing jet flaps along the trailing edge of the wing.

Referring now more particularly to the drawings and with reference to FIG. 1 which illustrates an embodiment of the invention attached to a bomb body 10. The forward section of the bomb body 10 has a nose section containing the guidance and electronics in its cylindrical portion 11. A radome 12 is shown attached at the outer most extremity. The radome 12 contains a tracking seeker operable in conjunction with the guidance and electronics to guide bomb body 10 along a desired path to a target. Many well known types of seeker and electronics instrumentation systems are suitable for utilization in carrying out the guidance function necessary to control bomb body 10 during its flight to a target, these being known to those skilled in the art.

Attached to bomb body 10 is wing 13 which is positioned at or near the center of gravity of the bomb. Wing 13 is shown attached to fairing 15, by means not shown, for providing the top section of the bomb body 10 with an exterior surface which reduces resulting drag caused by eddying air flow during flight of the bomb. A strap means such as 14 encircling the forward part of fairing 15 may be used to attach and hold wing 13 in position on the bomb body 10. The strap 14 is one of many fastening means which may be utilized to fasten fairing 15 to the bomb body 10. Other known fastening means, not shown may be utilized to attach the rear part of fairing 15 to bomb body 10. At the tail end of bomb body 10 is attached conventional fin assembly 16 for providing stability to the bomb during its flight to the target when released from the aircraft. Fins 16 may be fixed or partially rotatable for achieving some control over the bomb flight path.

Figure 3:
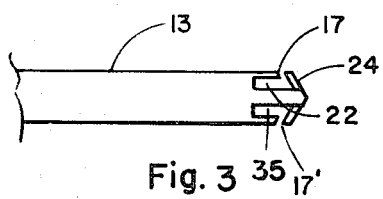
FIG. 3 is a sectional view of the trailing edge of the wing illustrating the jet slot.

Wing 13 has positioned along its trailing edge a series of aligned slots 17 and 18. Slots 17 are positioned on one side of the centerline of wing 13 and slots 18 are on the other side. On the underside of wing 13 are positioned similar slots 17' best shown in FIG. 3.

Figure 2:
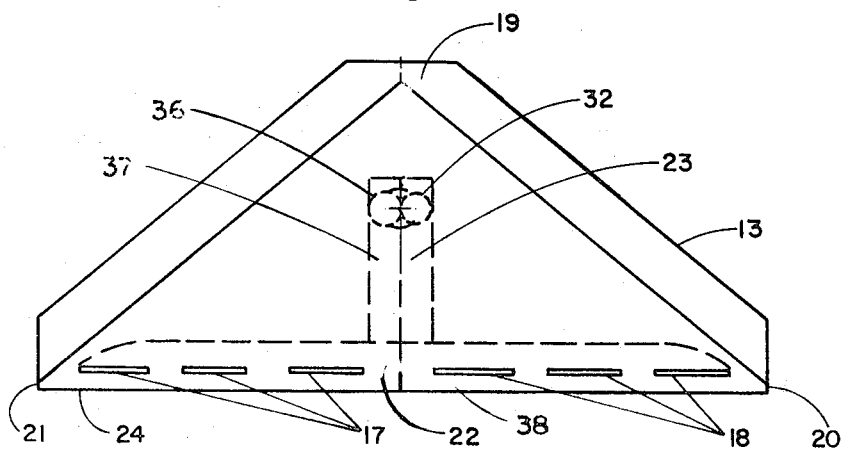
FIG. 2 is an enlarged view of the wing showing the jet flaps positioned on the wing.

Referring to FIG. 2, which shows a more detailed view of wing 13, slots 17 and 18 that are positioned on the upper surface of wing 13. Each series of slots 17 and 18 are positioned in a symmetrical arrangement along the trailing edge of wing 13 in approximately the same position on wing 13 where conventional aerodynamic surfaces would be placed. Hollow chambers 22 and 38 communicate with slots 17 and 18 and in like manner similar chambers not shown, communicate with slots positioned on the under side of wing 13. Connected to chamber 38 and control valve 32 is air passageway 23 that is positioned in the interior of wing 13. In like manner valve 36 and passageway 37 communicates with slots 17. Valves 32 and 36 are operatively attached to control the flow of compressed gas from a compressed gas source such as a gas generator, pump or ram air not shown. The interconnection of hollow chamber 22 with slot 17 may be better understood by reference to FIG. 3. Separate hollow chambers 22 and 38 extend along the edge of wing 13 and has the trailing edge tapered at 24 to cause an gas flow direction out of slots 17, 17' and 18 and a corresponding slot, not shown, in a direction toward the leading edge of the wing 13.

Referring to FIG. 2, wing 13 is shown as a delta wing having a tapered leading edge 19. Ends 20 and 21 of wing 13 are clipped as shown. The wing 13 is intended to be a mono-wing configuration capable of attachment to existing low drag bombs.

Figure 5:
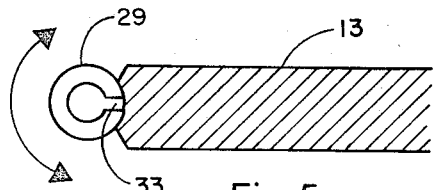
FIG. 5 is a sectional view of the slots rotated to the off position.
Figure 6:
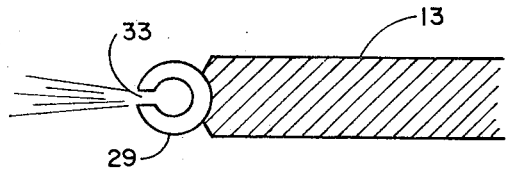
FIG. 6 is a sectional view of the slots rotated to a position for providing axial thrust.
Figure 7:
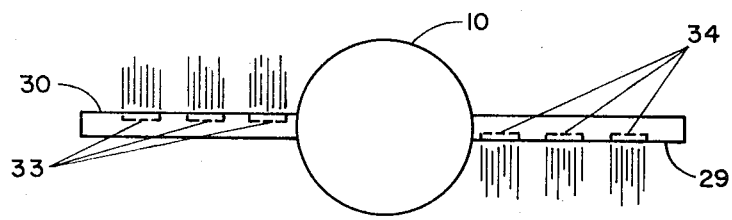
FIG. 7 is a cross sectional view of the slots rotated so as to provide roll control.

FIGS. 5 through 7 show another embodiment of the invention where the jet flap is movable rather than fixed. Reference to FIG. 5 shows wing 13 with a cylindrical tube 30 extending across its trailing edge. Tube 30 is supported at the centerline of wing 13 by means of center support member 31. Cylindrical tubes 29 and 30 are rotatively mounted in support member 31 by means of bearing members at 25 and 26. Additional bearing means are located adjacent clipped wing tip 21 and 20, not shown, to allow cylindrical tubes 29 and 30 to be rotated independently of one another through 360°. The amount of rotation of each cylindrical tube 29 and 30 is determined by control signals from guidance and electronics package in cylindrical portion 11. A control actuator 32 operates upon command from the guidance and electronics package to operate cylindrical tubes 29 and 30 to the desired angle. Reference to FIGS. 5 and 6 shows various positions of rotation of cylindrical tube 29. A series of slots 33 and 34 communicate with interior air passageways of cylindrical tubes 29 and 30, this feature being best shown by reference to FIG. 7.

In operation the bomb body 10 is released from an aircraft some distance from the desired target. The guidance and electronics package at 41 through the seeker in radome 12 locks on the chosen target and activates valve 32 to allow a flow of a predetermined amount of compressed gas through air passages 23, 37 into hollow chamber 22, 38 and out slots 17 and 18. This volume of gas is controlled so that the wing gives a very high lift to drag ratio allowing the bomb to maintain a more constant velocity over its glide path trajectory.

Control of the bomb body 10 in roll or attitude can be maintained by actuation of valves 32, 36 and similar valves not shown for controlling the flow of gas through four separate passageways. These passageways 23, 37 for the slots on the top of surface wing 13 and similar passageways not shown for slots on the bottom surface of wing 13 allow predetermined amounts of gas to pass to each series of slots.

Figure 4:
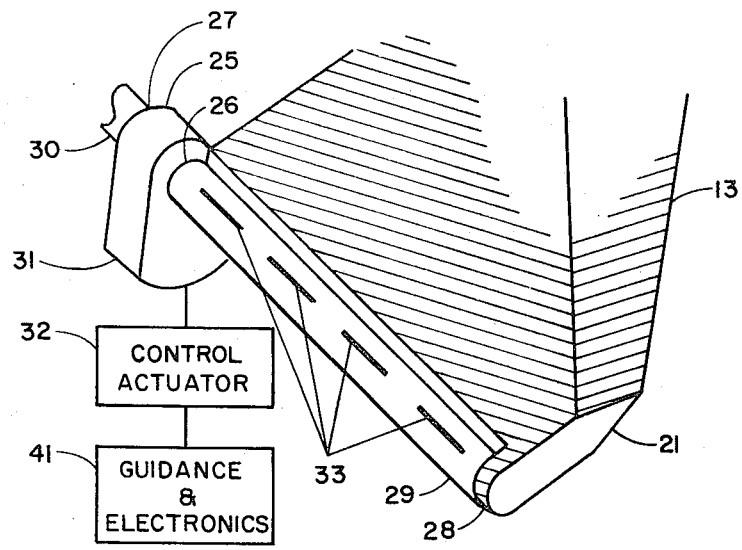
FIG. 4 is a sectional view of an embodiment of the invention showing the jet slots in an arrangement that permits rotation through 360°.

To control the bomb body 10 in roll or attitude the rotary jet flap of FIG. 4 may be used. Control signals from guidance and electronics package 41 send electrical signals to control actuator 32 to rotate cylindrical tubes 29 and 30 to cause the bomb body 10 to remain on target during its glide once released from the aircraft. Control actuator allows a predetermined volume of air to flow through a valve similar to valve 32 to cause bomb body to remain locked on the chosen target regardless of the evasive maneuvers of the target. This bomb attitude control is achieved with the independent controlled operation of cylindrical tubes 29 and 30.

An additional feature of the invention permits cylindrical tubes 29 and 30 to be rotated to a complete off position best shown in FIG. 5. During periods of flight where no attitude control is needed cylindrical tubes 29 and 30 can be rotated as shown in FIG. 6 for providing axial thrust during the bomb's glide path trajectory thereby providing a given amount of acceleration to cancel some of the induced drag on bomb body 10 thus causing bomb body 10 to maintain a substantially constant velocity thereby providing a constant maneuvering capability during its flight.

Obviously many modifications and variations of the present invention are possible in the light of the above teachings. It is therefore to be understood that within the scope of the apended claims the invention may be practiced otherwise than as specifically described.

What is claimed is:

1. A control apparatus for use with an aerial missile the combination comprising:
    guidance control means for said aerial missile;
    a wing attached to said aerial missile;
    aperture means positioned substantially adjacent the trailing edge of said wing and extending on either side of the center line of said wing;
    hollow chamber means in communication with said apertures and having two rotatable substantially cylindrical tubes independently rotatable from each other;
    attachment means at the inner and outer ends of said cylindrical tubes for attachment of said tubes to extend substantially along the entire length of the trailing edge of said wing and adjacent thereto;
    control actuator means for selectively moving said cylindrical tubes through 360° in response to signals from said guidance unit; and
    air passage means from said missile to said hollow chamber means;
    whereby compressed gas from the missile is controlled by said guidance control to cause gas flow through said air passage into said hollow chamber and out through said apertures.

2. The apparatus of claim 1 wherein said two rotatable cylindrical tubes have apertures for providing jet outlets and said apertures are positioned symmetrically along the longitudinal axis of said cylindrical tubes.

3. The apparatus of claim 1 wherein said two rotatable cylindrical tubes are independently movable through 360° for providing positioning of said apertures at any predetermined angle.

\* \* \* \* \*